(12) United States Patent
Kang et al.

(10) Patent No.: US 9,940,531 B2
(45) Date of Patent: Apr. 10, 2018

(54) APPARATUS AND METHOD FOR SETTING REGION OF INTEREST

(71) Applicant: ADASONE, INC., Seoul (KR)

(72) Inventors: Kyung Soo Kang, Seoul (KR); Keun Ho Kang, Seoul (KR); Tae Keun Kim, Guri-si (KR)

(73) Assignee: ADASONE, INC., Seoul (KR)

( * ) Notice: Subject to any disclaimer, the term of this patent is extended or adjusted under 35 U.S.C. 154(b) by 117 days.

(21) Appl. No.: 15/160,009

(22) Filed: May 20, 2016

(65) Prior Publication Data
US 2017/0220881 A1    Aug. 3, 2017

(30) Foreign Application Priority Data

Feb. 3, 2016  (KR) .................. 10-2016-0013633

(51) Int. Cl.
G06K 9/00      (2006.01)
G06K 9/32      (2006.01)
G06T 7/00      (2017.01)

(52) U.S. Cl.
CPC ..... *G06K 9/00825* (2013.01); *G06K 9/00664* (2013.01); *G06K 9/00798* (2013.01); *G06K 9/3233* (2013.01); *G06T 7/0044* (2013.01); *G06T 2207/30252* (2013.01)

(58) Field of Classification Search
CPC .......... G06K 9/00798; G06K 9/00825; G06K 9/00818; G06K 9/00791
See application file for complete search history.

(56) References Cited

U.S. PATENT DOCUMENTS

2015/0073705 A1* 3/2015 Hiwatashi .............. G01S 19/48
                                                            701/468
2017/0024622 A1* 1/2017 Mizutani ............ G06K 9/00825

FOREIGN PATENT DOCUMENTS

KR   10-2009-0055848 A   6/2009
KR   10-2014-0090873 A   7/2014

OTHER PUBLICATIONS

Korean Intellectual Property Office, Communication dated Feb. 1, 2017, issued in counterpart Korean Application No. 10-2016-0013633.

* cited by examiner

*Primary Examiner* — Stephen R Koziol
*Assistant Examiner* — Raphael Schwartz
(74) *Attorney, Agent, or Firm* — Sughrue Mion, PLLC

(57) ABSTRACT

An apparatus and method for setting a region of interest of a vehicle that is being driven is provided. The apparatus includes an image capturing unit configured to capture a front image of the vehicle that is being driven, a memory configured to store a program for setting the region of interest of the vehicle that is being driven, and a processor. The processor obtains a current position of the vehicle and lane information corresponding to the current position based on the front image captured by the image capturing unit by executing the program, and sets the region of interest needed for recognition of a signal light based on the obtained lane information, and the processor sets a region including a lane corresponding to another vehicle driving in the same direction as the vehicle that is being driven in the front image as the region of interest.

5 Claims, 5 Drawing Sheets

APPARATUS AND METHOD FOR SETTING REGION OF INTEREST

CROSS-REFERENCE TO RELATED APPLICATION

This application claims priority to and the benefit of Korean Patent Application No. 10-2016-0013633, filed on Feb. 3, 2016, the disclosure of which is incorporated herein by reference in its entirety.

BACKGROUND

1. Field of the Invention

The present invention relates to an apparatus and method for setting a region of interest, and more particularly, to an apparatus and method for setting a region of interest capable of rapidly setting a region of interest needed for recognition of a signal light in a vehicle that is being driven

2. Discussion of Related Art

Currently, a vehicle provides various services for safe driving by installing various sensors in the front, the rear, and sides of the vehicle. For example, a service of transmitting a distance to an obstacle using a rear sensor by sound or displaying the distance on a screen when moving backwards, or a service of generating an alarm by recognizing a lane or another vehicle located in the front or side of the vehicle, etc. are being provided to support safe driving.

However, many accidents are being occurring while driving even when additional services are being provided. Particularly, many accidents occur due to careless driving of a driver when a lane changing or a signal light changes.

Various technologies are being developed in order to prevent the accidents due to careless driving of the driver in advance. For example, there is a technology of recognizing a color of a signal light when the signal light changes and providing it to the driver. This technology extracts color information from the color of the signal light, and provides the color information to the driver.

In order to provide the color information of the signal light to the driver, the signal light should be rapidly detected, but the current technology has a problem in that its processing speed is slow. Accordingly, in order to rapidly detect the signal light having a high relevance which is directly related to traffic accidents, a technology of rapidly detecting a region of interest in which the signal light exists is needed.

In this regard, a technology of classifying an image captured by a camera installed in a vehicle as a region of interest according to a distance with the camera, and performing an image processing of adjusting resolution with respect to the classified region of interest is disclosed in Korean Patent Application No. 10-2014-0099873 (Title of the invention: Image Processing Apparatus and Method for Vehicle).

SUMMARY OF THE INVENTION

The present invention is directed to an apparatus and method for setting a region of interest capable of setting the region of interest needed for recognition of a signal light by obtaining a current position of a vehicle and lane information from a front image captured from the vehicle that is being driven.

The technical aspects which embodiments of the present invention are intended to achieve are not limited to the aspect described above, and other technical aspects may exist.

According to one aspect of the present invention, there is provided an apparatus for setting a region of interest of a vehicle that is being driven, including: an image capturing unit configured to capture a front image of the vehicle that is being driven; a memory configured to store a program for setting the region of interest of the vehicle that is being driven; and a processor configured to execute the program, wherein the processor obtains a current position of the vehicle and lane information corresponding to the current position based on the front image captured by the image capturing unit by executing the program, and sets the region of interest needed for recognition of a signal light based on the obtained lane information, and the processor sets a region including a lane corresponding to another vehicle driving in the same direction as the vehicle that is being driven in the front image as the region of interest.

According to another aspect of the present invention, there is provided a method for setting a region of interest of a vehicle that is being driven, including: capturing a front image of the vehicle that is being driven; obtaining a current position of the vehicle and lane information corresponding to the current position based on the front image; and setting the region of interest needed for recognition of a signal light based on the obtained lane information, wherein the setting of the region of interest sets a region including a lane corresponding to another vehicle driving in the same direction as the vehicle that is being driven in the front image as the region of interest.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present invention are described below in sufficient detail to enable those of ordinary skill in the art to embody and practice the present invention. However, the present invention is not limited to embodiments which will be described hereinafter, and may be implemented as various different types. In order to clearly describe the present invention, portions which are not related to the description will be omitted.

Throughout the specification, the terms "comprises," "comprising," "includes," and/or "including," when used herein, specify the presence of stated elements, or components, but do not preclude the presence or addition of one or more other elements, or components.

Figure 1:
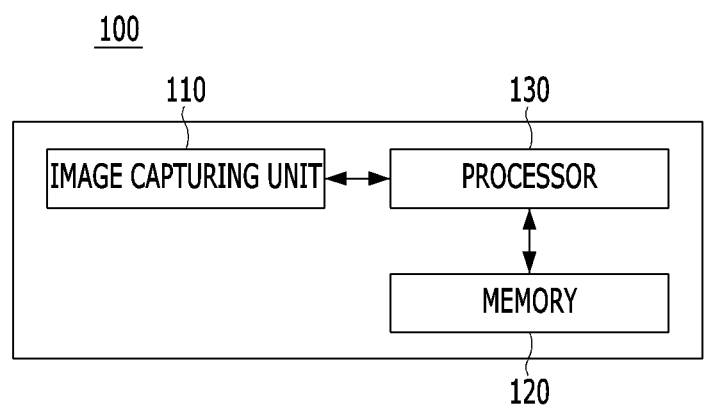
FIG. 1 is a block diagram illustrating an apparatus for setting a region of interest according to an embodiment of the present invention.

FIG. 1 is a block diagram illustrating an apparatus for setting a region of interest 100 according to an embodiment of the present invention.

The apparatus for setting a region of interest 100 according to an embodiment of the present invention may include an image capturing unit 110, a memory 120, and a processor 130.

The image capturing unit 110 may capture a front image of a vehicle that is being driven. In this case, the image capturing unit 110 may be installed to have an angle capable of capturing all of a driving path of a vehicle, a lane, a stop line, a signal light, etc. while driving. The image capturing unit 110 may be installed inside the vehicle in order not to be influenced by an external environment, or be installed outside the vehicle.

A program for setting a region of interest of the vehicle that is being driven may be stored in the memory 120. Here, the memory 120 may be a non-volatile memory device which continuously maintains stored information even when power is not supplied, or a volatile memory device.

For example, the memory 120 may include a NAND flash memory such as a compact flash (CF) card, a secure digital (SD) card, a memory stick, a solid state drive (SSD), and a micro SD card, etc., a magnetic computer storage device such as a hard disk drive (HDD), etc. and an optical disc drive such as a compact disk-read only memory (CD-ROM), and a digital versatile disk-read only memory (DVD-ROM), etc.

Further, the program stored in the memory 120 may be implemented in a software form or in a hardware form such as a field programmable gate array (FPGA), or an application specific integrated circuit (ASIC), etc., and perform predetermine functions.

The processor 130 may execute the program stored in the memory 120. The processor 130 may obtain a current position of the vehicle and lane information corresponding to the current position based on the front image captured by the image capturing unit 110 by executing the program stored in the memory 120.

In this case, the current position of the vehicle may be extracted from the front images captured by the image capturing unit 110 to correspond to the lane in which the vehicle is currently positioned. The current position of the vehicle may be obtained by a position detector (not shown) such as a global positioning system (GPS), etc.

Moreover, the lane information may be obtained from the front image obtained by the image capturing unit 110, and also be obtained through a lane recognition module such as a front sensor, a side sensor, etc.

The lane information may include a white lane line, a yellow lane line, etc. for driving.

When the current position of the vehicle and the lane information are obtained, the processor 130 may set a region of interest needed for recognition of a signal light based on the obtained lane information. The signal light should exist within the range of 20 degrees based on a traveling direction of the vehicle according to a road traffic law. Accordingly, the signal light may be recognized rapidly by extracting a region within the range of 20 degrees based on the traveling direction of the vehicle as the region of interest.

For this, the processor 130 may set a region including a lane corresponding to another vehicle driving in the same direction as the vehicle that is being driven of the front image as the region of interest (hereinafter, a first region of interest). A method of setting the first region of interest will be described with reference to FIG. 2.

Figure 2A:
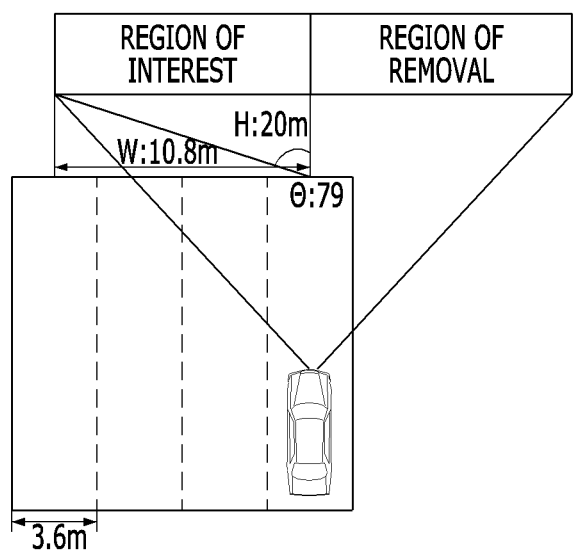
FIG. 2A to 2B is a diagram for describing an operation of setting a first region of interest according to an embodiment of the present invention.
Figure 2B:
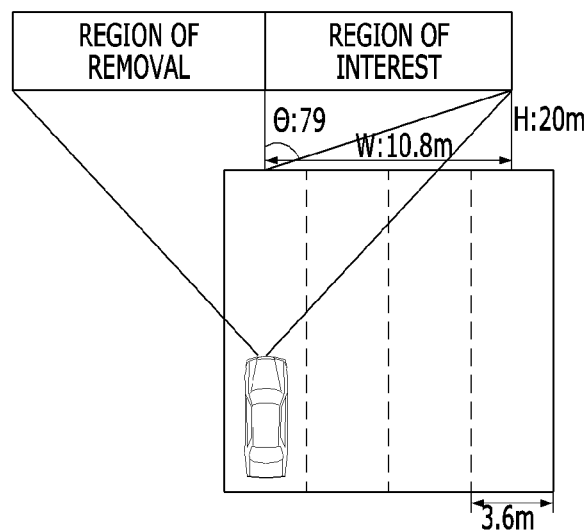

FIG. 2A to 2B is a diagram for describing an operation of setting a first region of interest according to an embodiment of the present invention.

When the current position of the vehicle that is being driven and the lane information are obtained from the front image, a region including the lane corresponding to another vehicle driving in the same direction based on the current position of the vehicle that is being driven (that is, the center of a lane in which the vehicle is positioned) may be set as the first region of interest.

For example, as shown in FIG. 2A, when a lane that is being driven on is a fourth lane, the outermost portion of the lanes may be removed, and the remaining region may be extracted as the first region of interest.

Further, as shown in FIG. 2B, when the lane that is being driven on is a first lane, a region including the lane corresponding to another vehicle driving in the opposite direction of the vehicle while driving (that is, an outer portion of a center line) may be removed, and the remaining region may be extracted as the first region of interest.

Figure 3A:
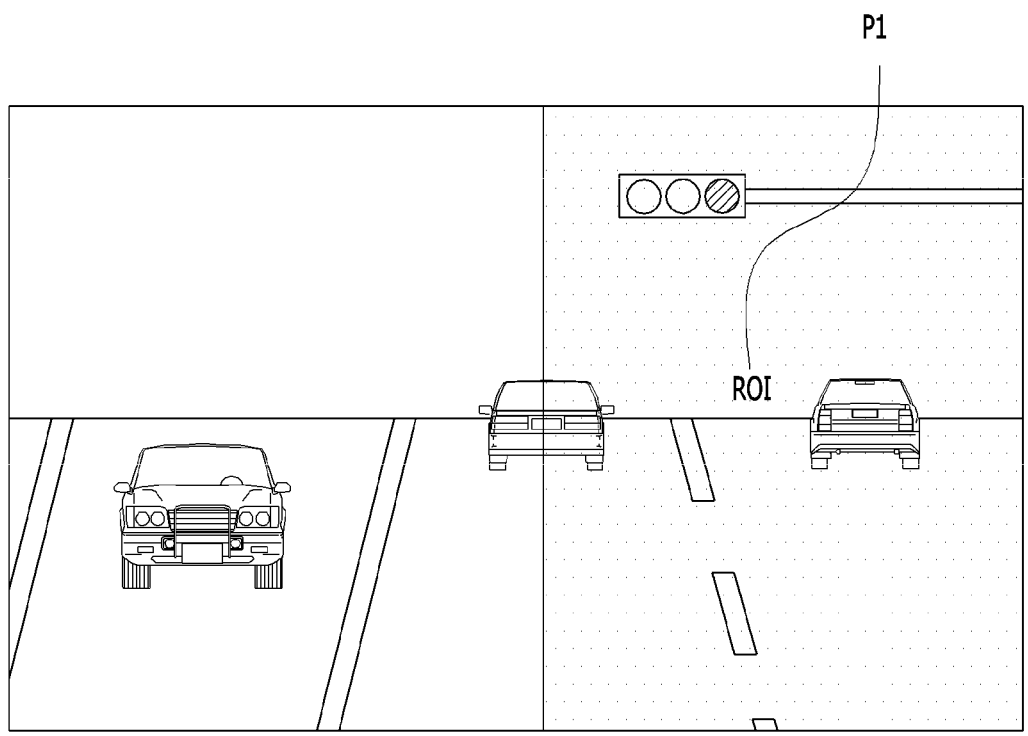
FIGS. 3A to 3C are diagrams for describing an operation of setting first to third regions of interest according to an embodiment of the present invention.
Figure 3B:
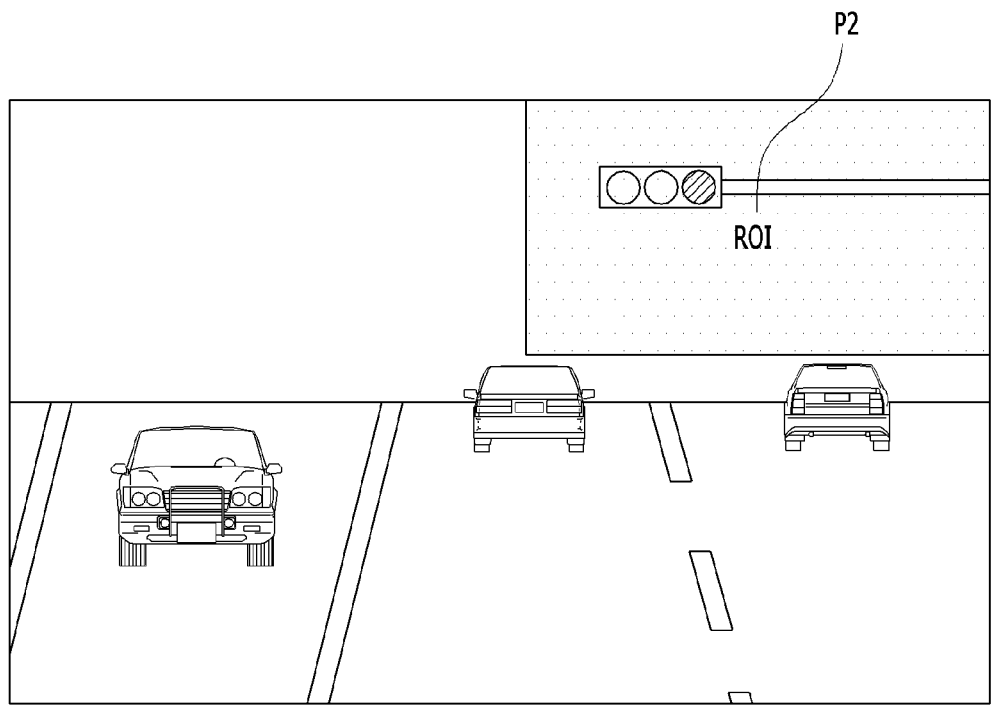
Figure 3C:
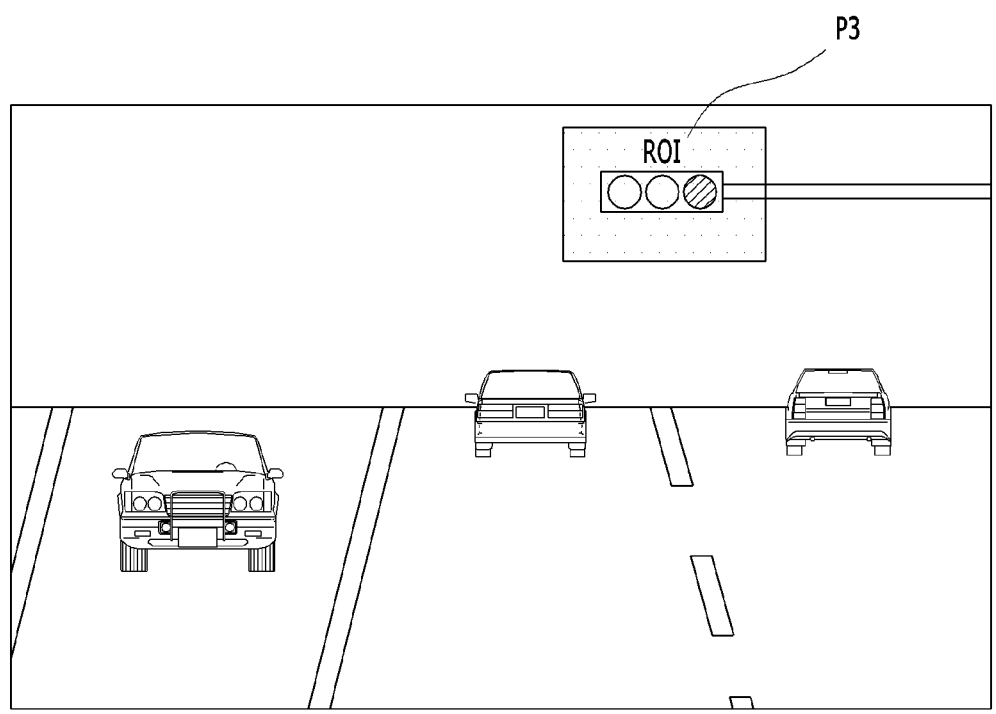

As such, when the processor 130 extracts the first region of interest, as shown in FIGS. 3A to 3C, a second or third region of interest may be extracted and set in order to set the region of interest more rapidly.

FIGS. 3A to 3C are diagrams for describing an operation of setting first to third regions of interest according to an embodiment of the present invention.

First, in a state in which a first region of interest P1 is extracted as shown in FIG. 3A, the processor 130 may extract a region which is equal to or less than a height of a signal light from a front image captured by the image capturing unit 110, as shown in FIG. 3B. Further, the processor 130 may remove the extracted region, and set the remaining region as a region of interest (hereinafter, a second region of interest P2).

Meanwhile, there may be a problem in that a high amount of calculations are required in order to immediately calculate the height of the signal light from the image captured by the image capturing unit 110. Accordingly, the processor 130 may calculate a straight-line distance between a lane in which the vehicle is positioned and a lane in which the signal light is positioned, and calculate a diagonal-line distance between the lane in which the vehicle is positioned and the signal light. After this, the processor 130 may extract the height of the signal light based on the straight-line distance and the diagonal-line distance.

For this, referring to FIG. 2A, since an interval between lanes is 3.6 m according to a road traffic law, in a state in which the information is pre-stored in the memory 120, the processor 130 may calculate 10.8 m, which is the straight-line distance between the lane and the lane in which the signal light is positioned, based on the obtained lane information.

After this, the processor 130 may calculate an angle between the vehicle and the signal light when calculating the diagonal-line distance between the current position of the vehicle and the signal light. As such, the processor 130 may calculate the height of the signal light (2 m, which is the height of a signal light for a pedestrian in FIG. 2A) based on the calculated information. Further, the processor 130 may remove a region which is equal to or less than the height of the signal light, and set the remaining region as the second region of interest P2.

When setting the second region of interest P2, since a region corresponding to a predetermined height from the ground is removed, the region of interest needed for the recognition of a signal light may be minimized.

Figure 4A:
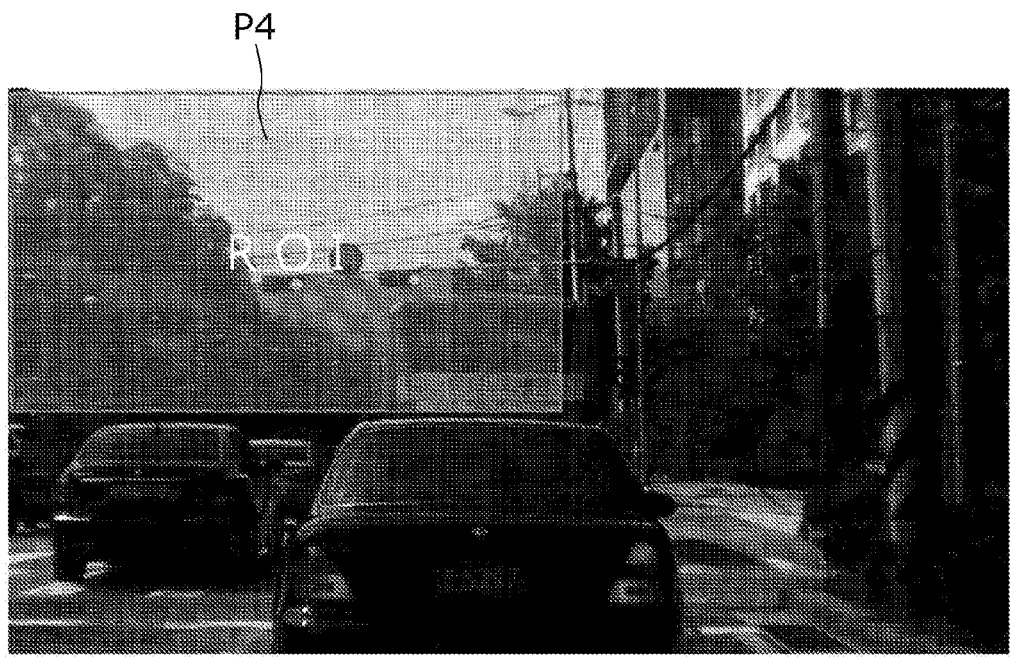
FIG. 4A to 4B is a diagram illustrating an example of a second region of interest set according to an embodiment of the present invention.
Figure 4B:
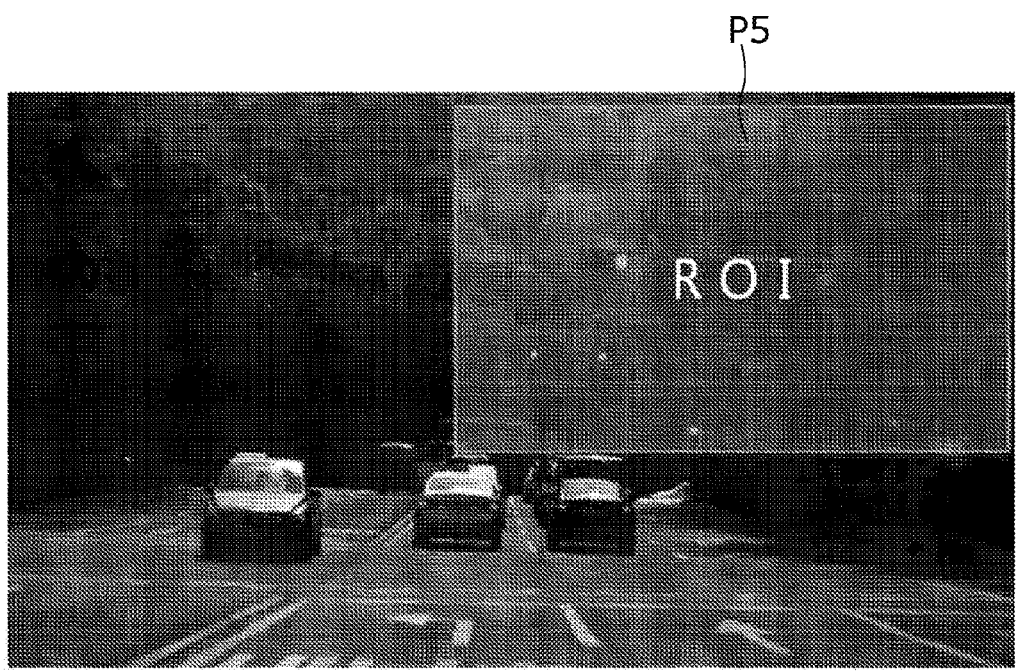

The set second region of interest may be illustrated as shown in FIG. 4A to 4B.

FIG. 4A to 4B is a diagram illustrating an example of a second region of interest set according to an embodiment of the present invention.

FIG. 4A illustrates an example in which a lane of the vehicle that is being driven is the fourth lane, and FIG. 4B illustrates an example in which the lane of the vehicle that is being driven is the first lane. Since a size of the second region of interest is reduced to have about a quarter a size of the front image which is initially obtained, the signal light may be recognized more rapidly by using the reduced second region of interest.

Referring back to FIG. 3C, the processor 130 may confirm whether a position of the signal light which was detected is stored in the memory 120. When it is confirmed that the position of the signal light which was detected is stored, the processor 130 may set a predetermined range (for example, 100 pixels in a horizontal direction and 50 pixels in a vertical direction of the front image) from the position of the signal light which was detected as the region of interest (a third region of interest P3).

Accordingly, the processor 130 may extract the third region of interest P3 more rapidly based on a color and a change of the color of the signal light from the third region of interest P3. The set third region of interest P3 may be extracted using an optical flow or a Kalman filter.

For reference, components shown in FIG. 1 according to an embodiment of the present invention may be implemented by software or hardware such as an FPGA or an ASIC, and perform predetermined functions.

However, the term "components" is not limited to software or hardware, and each component may be configured to include a storage medium which is addressable, and be configured to operate one or more processors.

Accordingly, as an example, the component may include components such as software components, object-oriented software components, class components, and task components, processors, functions, attributes, procedures, subroutines, segments of program code, drivers, firmware, a microcode, a circuit, data, a memory, data structures, tables, arrays, and variables.

The components and functions provided in the components may be combined into fewer components, or further separated into additional components.

Hereinafter, with reference to FIG. 5, a method for setting a region of interest of the apparatus for setting a region of interest 100 according to an embodiment of the present invention will be described.

Figure 5:
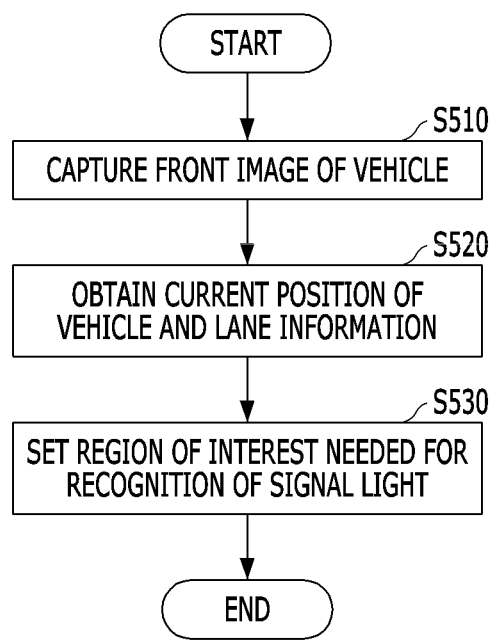
FIG. 5 is a flowchart for describing a method for setting a region of interest according to an embodiment of the present invention.

FIG. 5 is a flowchart for describing the method for setting a region of interest according to an embodiment of the present invention.

First, the method for setting a region of interest according to an embodiment of the present invention may capture a front image of a vehicle that is being driven (S510).

Next, the method may obtain a current position of the vehicle that is being driven and lane information corresponding to the current position based on the captured front image (S520).

Next, the method may set a region of interest needed for recognition of a signal light based on the obtained lane information (S530). In this case, the apparatus for setting a region of interest 100 may set a region including a lane corresponding to another vehicle driving in the same direction as the vehicle being driven in the captured front image as the region of interest (a first region of interest).

Meanwhile, the apparatus for setting a region of interest 100 may extract a region which is equal to or less than a height of the signal light, remove the extracted region from the first region of interest, and set the remaining region as a region of interest (a second region of interest).

In this case, an operation of extracting the region which is equal to or less than the height of the signal light may calculate a straight-line distance between a lane in which the vehicle is positioned and a lane in which the signal light is positioned, calculate a diagonal-line distance between the lane in which the vehicle is positioned and the signal light, and extract the height of the signal light based on the straight-line distance and the diagonal-line distance.

Meanwhile, the method of setting a region of interest according to an embodiment of the present invention may confirm whether a position of the signal light which was detected is stored, and set the predetermined region from the position of the signal light which was detected as a region of interest (a third region of interest) when it is confirmed that the position of the signal light is stored. Accordingly, the set region of interest may be extracted based on a color and a change of the color of the signal light.

According to an embodiment of the present invention described above, the region of interest in which the signal light exists in the image may be set using the front image captured in the vehicle while driving.

Here, in the present invention, compared with the conventional art, a speed of detecting the signal light included in the region of interest may be improved by about two times by extracting a minimum region of interest based on the lane information and the current position.

An embodiment of the present invention may be implemented in a form of a recording medium including a computer program stored in a computer executable medium, or a computer executable command. The computer readable medium may be an arbitrary available medium which is able to be accessed by a computer, and include a volatile or non-volatile medium, and a separable or nonseparable medium. Further, the computer readable medium may include a computer storage medium, and a communication medium. The computer storage medium may include the volatile or non-volatile medium, and the separable or non-separable medium implemented using an arbitrary method or technology for storing information such as a computer readable command, a data structure, a program module, or other data. The communication medium may generally include a computer readable command, a data structure, a program module, other data of a modulated data signal such as a carrier wave, or another transmission mechanism, and include an arbitrary information transmission medium.

The method and system of the present invention is described with reference to specific embodiments, but some or all of the components or the operations may be implemented using a computer system having a general hardware architecture.

The above-described embodiments of the present invention are merely examples, and it should be apparent to those skilled in the art that various modifications may be made to the above-described embodiments of the present invention without departing from the spirit or the scope of the invention. Accordingly, it should be understood that the embodiments of the present invention are not intended to limit the scope of the invention but to describe the invention in all aspects. For example, each component described in a singular form may be implemented in a distributed form, and similarly, components described in a distributed form may be implemented in a combined form.

According to an embodiment of the present invention, a region of interest in which a signal light exists in an image may be set using the front image captured in a vehicle that is being driven.

In this case, compared with the conventional art, the speed of detecting the signal light included in a region of interest may be improved by two times by setting the region of interest based on lane information and a current position.

Further, the signal light may be recognized more rapidly in the image captured in the vehicle that is being driven.

The scope of the present invention is defined by the appended claims, and it is intended that the present invention covers all such modifications provided they come within the scope of the appended claims and their equivalents.

What is claimed is:

1. An apparatus for setting a region of interest of a vehicle that is being driven, comprising:
    an image capturing unit configured to capture a front image of the vehicle that is being driven;
    a memory configured to store a program for setting the region of interest of the vehicle that is being driven; and
    a processor configured to execute the program,
    wherein the processor obtains a current position of the vehicle and lane information corresponding to the current position based on the front image captured by the image capturing unit by executing the program, and sets the region of interest needed for recognition of a signal light based on the obtained lane information, and
    the processor sets a region including a lane corresponding to another vehicle driving in the same direction as the vehicle that is being driven in the front image as the region of interest,
    wherein the processor extracts a region which is equal to or less than a height of the signal light from the front image, removes the extracted region, and sets a remaining region as the region of interest, and
    wherein the processor calculates a straight-line distance between a lane in which the vehicle is positioned and a lane in which the signal light is positioned, calculates a diagonal-line distance between the lane in which the vehicle is positioned and the signal light, and extracts the height of the signal light based on the straight-line distance and the diagonal-line distance.

2. The apparatus for setting a region of interest of claim 1, wherein the processor confirms whether a position of a signal light which is detected is stored, and when it is confirmed that the position of the signal light which is detected is stored, sets a predetermined region from the position of the signal light which is detected as the region of interest.

3. The apparatus for setting a region of interest of claim 2, wherein the processor extracts the set region of interest based on a color or a change of the color of the signal light.

4. A method for setting a region of interest of a vehicle that is being driven by an apparatus for setting a region of interest, comprising:
    capturing a front image of the vehicle that is being driven;
    obtaining a current position of the vehicle and lane information corresponding to the current position based on the front image; and
    setting the region of interest needed for recognition of a signal light based on the obtained lane information,
    wherein the setting of the region of interest sets a region including a lane corresponding to another vehicle driving in the same direction as the vehicle that is being driven in the front image as the region of interest,
    wherein the setting of the region of interest comprises:
    extracting a region which is equal to or less than a height of the signal light in the front image;
    removing the extracted region, and setting a remaining region as the region of interest, and
    wherein the extracting of the region which is equal to or less than the height of the signal light comprises:
    calculating a straight-line distance between a lane in which the vehicle is positioned and a lane in which the signal light is positioned;
    calculating a diagonal-line distance between the lane in which the vehicle is positioned and the signal light; and
    extracting the height of the signal light based on the straight-line distance and the diagonal-line distance.

5. The method for setting a region of interest of claim 4, further comprising:
    confirming whether a position of a signal light which is detected is stored;
    when it is confirmed that the position of the signal light which is detected is stored, setting a predetermined region from the position of the signal light which is detected as the region of interest; and
    extracting the set region of interest based on a color or a change of the color of the signal light.

* * * * *